(12) United States Patent
Johnson et al.

(10) Patent No.: US 9,579,593 B2
(45) Date of Patent: Feb. 28, 2017

(54) REPLACEABLE FUEL SEPARATION UNIT

(75) Inventors: Paul Oakley Johnson, Corning, NY (US); Brandon T Sternquist, Corning, NY (US); Randall D. Partridge, Califon, NJ (US)

(73) Assignees: Corning Incorporated, Corning, NY (US); ExxonMobil Research and Engineering Company, Annadale, NJ (US)

( * ) Notice: Subject to any disclaimer, the term of this patent is extended or adjusted under 35 U.S.C. 154(b) by 720 days.

(21) Appl. No.: 13/534,370

(22) Filed: Jun. 27, 2012

(65) Prior Publication Data

US 2013/0168311 A1    Jul. 4, 2013

Related U.S. Application Data

(60) Provisional application No. 61/502,980, filed on Jun. 30, 2011.

(51) Int. Cl.
| | |
|---|---|
| *B01D 61/36* | (2006.01) |
| *B01D 63/06* | (2006.01) |
| *F02M 37/00* | (2006.01) |
| *B01D 35/00* | (2006.01) |
| *F02D 19/06* | (2006.01) |

(52) U.S. Cl.
CPC ......... *B01D 35/005* (2013.01); *B01D 61/366* (2013.01); *B01D 63/066* (2013.01); *F02M 37/0064* (2013.01); *B01D 2313/13* (2013.01); *F02D 19/0671* (2013.01); *Y02T 10/36* (2013.01)

(58) Field of Classification Search
CPC ... B01D 61/366; B01D 35/005; B01D 63/066
See application file for complete search history.

(56) References Cited

U.S. PATENT DOCUMENTS

| | | | |
|---|---|---|---|
| 4,814,087 A | 3/1989 | Taylor | 210/641 |
| 5,062,910 A | 11/1991 | Garcera et al. | 156/82 |
| 5,482,625 A | 1/1996 | Shimizu et al. | 210/321.84 |
| 5,766,468 A * | 6/1998 | Brown et al. | 210/323.2 |
| 5,888,384 A * | 3/1999 | Wiederhold et al. | 210/130 |
| 6,126,833 A | 10/2000 | Stobbe et al. | 210/650 |
| 6,258,144 B1 | 7/2001 | Huang | 55/385.3 |
| 6,711,893 B2 | 3/2004 | Ueda et al. | 60/285 |
| 6,972,093 B2 | 12/2005 | Partridge et al. | |
| 7,013,844 B2 | 3/2006 | Oda | 123/3 |
| 7,423,192 B2 | 9/2008 | Sabottke et al. | 585/819 |

(Continued)

FOREIGN PATENT DOCUMENTS

| | | |
|---|---|---|
| EP | 1443202 | 4/2004 |
| EP | 1373698 | 11/2005 |

(Continued)

OTHER PUBLICATIONS

EP2228113 Description Machine Translation.pdf,-Aug. 3 2010.*

(Continued)

*Primary Examiner* — Krishnan S Menon
*Assistant Examiner* — Bradley R Spies
(74) *Attorney, Agent, or Firm* — Dinsmore & Shohl LLP

(57) ABSTRACT

Disclosed herein is a replaceable fuel separation unit having a permeable substrate for separating a fluid source into at least two separate fluid streams, and delivering the two separated fluid streams to separate tanks.

20 Claims, 5 Drawing Sheets

(56) References Cited

U.S. PATENT DOCUMENTS

| | | |
|---|---|---|
| 7,459,084 B2 | 12/2008 | Baig et al. |
| 7,523,724 B2 | 4/2009 | Duraiswamy et al. ....... 123/1 A |
| 7,524,416 B1 | 4/2009 | Bergmen |
| 7,625,015 B2 | 12/2009 | Spiegelman et al. |
| 8,147,699 B2 | 4/2012 | Goldsmith et al. ........... 210/650 |
| 8,240,332 B1* | 8/2012 | Matusek et al. ......... 137/565.17 |
| 2004/0256321 A1 | 12/2004 | Goldsmith ................... 210/650 |
| 2005/0077227 A1* | 4/2005 | Kirker ................... B01D 63/02 210/321.69 |
| 2005/0133459 A1* | 6/2005 | Schulz ................... C02F 9/005 210/198.1 |
| 2008/0006333 A1 | 1/2008 | Partridge et al. ............. 137/571 |
| 2008/0093296 A1* | 4/2008 | Graham ............... B01D 61/145 210/636 |
| 2008/0110818 A1* | 5/2008 | Sugiura et al. ............ 210/321.8 |
| 2009/0242038 A1* | 10/2009 | Sengupta et al. ............... 137/93 |
| 2009/0301949 A1* | 12/2009 | Kolczyk et al. ............. 210/130 |
| 2010/0224549 A1 | 9/2010 | Micke et al. |
| 2012/0273502 A1* | 11/2012 | Merchant ...................... 220/565 |

FOREIGN PATENT DOCUMENTS

| | | |
|---|---|---|
| EP | 2228113 | 8/2010 |
| WO | 02/77429 | 3/2002 |
| WO | 2005049181 | 2/2005 |
| WO | WO2009085261 | 9/2009 |

OTHER PUBLICATIONS

CN201280032012.1 Notice of First Office Action; Mailed Sep. 29, 2015.

International Search Report of the International Searching Authority; PCT/US2012/042621; Mailed Sep. 19, 2012, 6 Pages.

\* cited by examiner

REPLACEABLE FUEL SEPARATION UNIT

CROSS-REFERENCE TO RELATED APPLICATIONS

This application claims the benefit of priority under 35 U.S.C. §119 of U.S. Provisional Application Ser. No. 61/502,980 filed on Jun. 30, 2011 the content of which is relied upon and incorporated herein by reference in its entirety.

FIELD

The disclosure relates to fuel systems and fuel supply apparatus for an internal combustion engine. More particularly, the disclosure provides a fuel separation unit for containing a separation membrane.

BACKGROUND

Fuel separation devices have been disclosed in, for example, U.S. Pat. Nos. 6,972,093 and 6,711,893. A fuel separation unit can accept a mixed feed stream, deliver the mixed feed stream to a permeable substrate, and separate the mixed feed stream into two streams, a retentate and a permeate. The feed stream can be a gas or a liquid. For example, If the separation unit is used to separate fuel such as gasoline, a mixed feed stream such as a fuel having a mixture of components can be heated and introduced to the fuel separation unit as a gas. The fuel can be separated into, for example, a relatively high Research Octane Number (RON) fuel portion and a relatively low RON fuel portion. The separated high RON fuel (the permeate) can then be cooled and delivered to a separate tank, to be used by the automobile when needed. An automobile may require high RON fuel during a high-output operation state such as at start up or upon acceleration. By providing a source of high RON fuel, the engine can perform better during high-output operation, For example, the ignition timing of the engine can be advanced, thereby increasing the output of the engine during these high-output operations.

SUMMARY

In a first embodiment, the disclosure provides a replaceable fuel separation unit comprising: a permeable substrate having a first end face, a second end face, a plurality of parallel channels extending from the first end face to the second end face, and an outer surface; a first housing structured and arranged to contain the permeable substrate, having an internal surface, the first housing comprising a first end plate and a second end plate, the first end plate comprising a first fluid passage and a first end plate seal structured and arranged to form a seal between the first end plate and the permeable substrate at or near the first end face of the permeable substrate, the second end plate comprising a second fluid passage, a permeate outlet, and a second end plate seal structured and arranged to form a seal between the second end plate and the permeable substrate at or near the second end face of the permeable substrate and a connector seal structured and arranged to form a releasable seal with a connector plate; a permeate chamber comprising a space formed between the outer surface of the permeable substrate and the internal surface of the first housing, wherein the permeate chamber is separated from the end faces of the permeable substrate by the first end plate seal and the second end plate seal.

In a second embodiment, the disclosure provides the separation unit of embodiment 1 wherein the first fluid passage is an inlet and the second fluid passage is a retentate outlet.

In a third embodiment, the disclosure provides the separation unit of embodiment 1 wherein the first fluid passage is a retentate outlet and the second fluid passage is an inlet.

In a fourth embodiment, the disclosure provides the fuel separation unit of any one of embodiments 1-3 wherein the connector plate comprises fittings to releasably attach the housing containing the permeable membrane to an inlet and a permeate outlet.

In a fifth embodiment, the disclosure provides the fuel separation unit of embodiment 4 wherein the housing is secured to the connector plate by a compression fitting.

In a sixth embodiment, the disclosure provides the fuel separation unit of embodiment 4 wherein the housing is secured to the connector plate by a screw-fitting.

In a seventh embodiment, the disclosure provides the fuel separation unit of any one of embodiments 1-6 further comprising the connector plate. In an eighth embodiment, the disclosure provides the fuel separation unit of embodiment 7 wherein the connector plate comprises an inlet, a permeate outlet and a retentate outlet.

In a ninth embodiment, the disclosure provides the fuel separation unit of any one of embodiments 1-8 wherein the connector plate comprises at least one groove for containing at least one seal.

In a tenth embodiment, the disclosure provides the fuel separation unit of any one of embodiments 1, 2 or 3, wherein at least one of the first end plate and the second end plate of the first housing comprises a manifold and wherein the seal formed between at least one of the first end plate and the second end plate and the permeable substrate is formed between the manifold and the permeable substrate.

In an eleventh embodiment, the disclosure provides the fuel separation unit of claim any one of embodiments 1, 2, 4-9, further comprising a second housing structured and arranged to provide a retentate chamber between an outer surface of first housing and an inner surface of second housing.

In a twelfth embodiment, the disclosure provides the separation unit of any one of embodiments 1-11 wherein the permeable substrate comprises a porous ceramic material.

In a thirteenth embodiment, the disclosure provides the separation unit of embodiment 12 wherein the permeable substrate is cylindrical.

DETAILED DESCRIPTION

Figure 1:
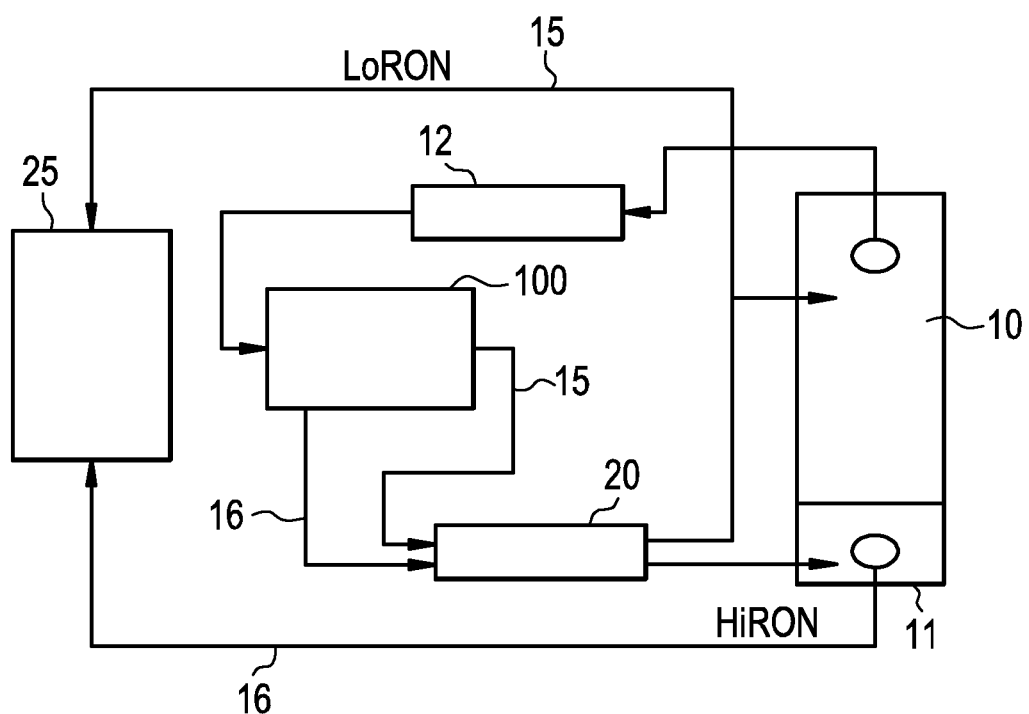
FIG. 1 is a schematic representation of an embodiment of the replaceable separation unit as a part of an octane separation system.

In embodiments, the disclosure provides a replaceable separation unit having a housing structured and arranged to contain a permeable substrate. The housing is structured and arranged to receive a feed stream and direct the feed stream to a permeable substrate having parallel channels extending from a first end face to the second end face of the permeable substrate. In use, a portion of the feed stream flows from one end face of the permeable substrate to the second end face of the permeable substrate through the channels of the permeable substrate. The portion of the feed stream that flows through the channels of the permeable substrate, and exits the permeable substrate through the second end face, is the retentate. The housing provides a retentate outlet to direct the retentate to a retentate tank.

Another portion of the feed stream passes across a separation membrane, into the permeable substrate and is separated from the feed stream to travel through the body of the permeable substrate, to exit through the outer surface of the permeable substrate into a permeate chamber. This feed stream that flows through the permeable substrate is the permeate. The permeate chamber has a permeate outlet to direct the permeate to a separate permeate tank. In this way, a retentate fuel stream is separated from a permeate fuel stream.

The housing contains the permeable substrate, and also defines a retentate and a permeate flow path. Fluid traveling through the retentate flow path begins at an inlet, travels through the permeable substrate, and exits the separation unit to flow through a retentate outlet, to be captured in a retentate tank. Fluid traveling through a permeate flow path begins at the inlet, travels through the permeable substrate through the channels of the substrate, exits the separation unit to flow through a permeate outlet, to be captured in a permeate tank.

In addition, the separation unit is structured and arranged to releasably engage with a connector plate to allow for the replacement of one separation unit with another separation unit when the useful life of the permeable substrate expires. In embodiments, the inlet and the retentate outlet are fluid passages, a first fluid passage and a second fluid passage that can be interchangeable, depending upon the orientation of the separation unit with respect to the direction of fuel flow. However, in embodiments, the inlet and the retentate outlet are on opposite end plates of the housing, enabling retentate fluid to flow from one end of the housing to the other end of the housing through the channels of the permeable substrate. The permeate outlet can be on either end face of the housing. In embodiments, the permeate outlet is on the housing end face that engages with the connector plate.

In embodiments, the separation unit is easily replaceable. In order to replace a separation unit, the existing unit must be removed by disengaging the separation unit from the fluid passages. There are three fluid passages, the inlet, the retentate outlet and the permeate outlet. Therefore, three fluid passage need to be disengaged and re-engaged in order to replace the separation unit. To reduce the number of steps required to replace the separation unit, the permeate outlet can be on the end face of the housing that engages with the connector plate. By locating the permeate outlet on the end face of the housing that engages with the connector plate, the number of connections that must be disengaged and re-engaged when a part is swapped is reduced from three to two, making the separation unit more easily replaceable.

In embodiments, the feed stream is gasoline. In this embodiment, gasoline can be separated into a higher RON fraction (HiRON) and a lower RON fraction (LoRON) by pervaporation across a polymer membrane applied on the internal surfaces, the channel surfaces, of the permeable substrate. Higher RON fractions, pass across a pervaporation membrane, flow into the permeable substrate and then flow into the permeate chamber. From the permeate chamber, the higher RON permeate can flow through the permeate outlet, through an optional cooler, and collect in a permeate tank. Lower RON fractions flow through the channels of the permeable substrate without passing across the pervaporation membrane, and exit the permeable substrate through the retentate outlet, to be delivered to a retentate tank, or re-circulated into the gasoline tank of the automobile.

FIG. 1 illustrates an embodiment of a system for separating gasoline by octane in a vehicle. FIG. 1 illustrates a fuel tank 10 having a separate compartment 11 to contain HiRON fuel. As shown in FIG. 1, gasoline is pumped from the fuel tank 10, through a fuel heater 12 to heat the fuel to a gas phase, and into the separation unit 100. In the separation unit, fuel is separated into a LoRON stream 15 (retentate) and a HiRON stream 16 (permeate). The HiRON stream passes through an optional fuel cooler 20 and into the separate fuel tank compartment (the HiRON tank or the permeate tank) 11. The HiRON fuel can then be pumped from the separate fuel tank compartment 11 to the engine 25 when needed. LoRON fuel exits the separation unit 100, passes through the optional fuel cooler 20 and is recirculated back to the fuel tank 10. Fuel from the fuel tank can be pumped to engine 25.

Embodiments of the separation unit are shown in FIGS. 2-6. In embodiments a permeable substrate 110, for example a ceramic honeycomb having a polymeric membrane to separate high-octane or HiRON components from lower octane or low RON components is provided. The polymeric membrane may be applied to the interior surfaces of the channels 115 of the ceramic honeycomb substrate. In this system, fuel, which is a mixture of HiRON and LoRON fuel is provided to the polymeric membrane. HiRON fuel is separated by the polymeric membrane, passes across the polymeric membrane, and flows into the permeable ceramic material of the permeable substrate. HiRON fuel (permeate) is then directed to a permeate outlet, and sent through a separate permeate fuel line, to a separate HiRON fuel tank. LoRON fuel does not pass through the polymeric membrane, and flows through the channels of the permeable substrate to exit the separation device through a retentate outlet, to be recirculated back to the first fuel tank.

The permeable substrate is contained in a housing 130. The fuel separation system must operate in an environment of fluctuating temperatures and caustic chemicals. From time to time, over the lifetime of a gasoline powered vehicle, in order to maintain the performance of the fuel separation system, the fuel separation unit must be replaced. For example, the fuel separation unit may need to be replaced at least once, and potentially several times, over the lifetime of the vehicle. In embodiments, the permeable substrate may be removed by itself. That is, in embodiments, the housing may be opened, the permeable substrate may be removed, a new permeable substrate may be placed in the unit, and the housing may be replaced. However, because of the structure of the fuel separation unit, and because of the complexity of the housing, it may be desirable to remove and replace the permeable substrate 110 along with its housing 130. Therefore, it is important that an easily replaceable separation unit be developed.

Reference will now be made in detail to embodiments of the present invention, as illustrated in the accompanying drawings. Whenever possible, the same reference numerals will be used throughout the drawings to refer to the same or like parts.

Figure 2A:
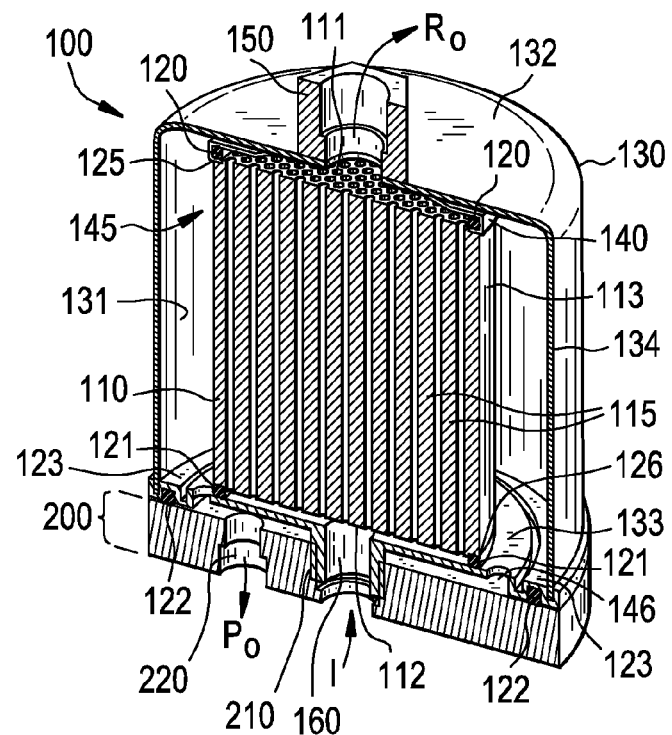
FIGS. 2A and B are cross-sectional views illustrating two embodiments of a replaceable fuel separation unit.

FIGS. 2A and B show embodiments of the fuel separation unit 100 of the present invention. The replaceable fuel separation unit has a permeable substrate 110 and a housing 130. In embodiments, the permeable substrate 110 has a first end face 111 and a second end face 112, an outer surface 113, and channels 115 running from the first end face 111 to the second end face 112. In embodiments, the outer surface of the permeable substrate is continuous. As shown in FIG. 1, the permeable substrate 110 is sealed by a seal 120 at or near the first end face 111. While seal 120 is shown seated at a peripheral edge 125 of the first end face, seal 120 can be placed around the outer surface 113 of the permeable substrate, at or near first end face 111. Seal can be contained in a seat or groove (see, for example, 123 in FIG. 2B). Similarly, the permeable substrate 110 is sealed at or near the second end face 112 by seal 121. While seal 121 is shown seated at a peripheral edge 126 of the second end face 112, seal 121 can be placed around the outer surface 113 of the permeable substrate, at or near second end face 112. In embodiments, the seal is placed at or near the end faces in order to ensure that a large percentage of the outer surface of the permeable substrate is available to allow for the flow of permeate from the inner surfaces of the permeable substrate to the outer surface of the permeable substrate.

In embodiments, the housing of the separation unit may be made from any suitable material. In embodiments, the housing and the connector plate are resistant to temperature fluctuations and chemical environments predictable from the contemplated use of the separation unit. For example, the housing(s) and connector plate may be made from metal.

The housing has a first fluid passage 150 and a second fluid passage 160. In embodiments, fluid flows in the direction shown by arrows. As shown in FIG. 2A, Retentate fluid flows in the second fluid passage 160 (I), through the channels of the permeable substrate to the first fluid passage 150 (the Ro passage, or the retentate outlet). Or, fluid flows in the second fluid passage (I), through the walls of the permeable substrate to the permeate chamber, and leaves the housing through the permeate outlet, Po. The retentate outlet (Ro) directs the flow of fluid exiting the channels of the permeable substrate out of the separation unit. The permeate outlet (Po) directs the flow of fluid exiting the permeate chamber out of the separation unit to a separate tank. Referring back to FIG. 1, the retentate outlet directs the flow of LoRON 15 (retentate) from the separation unit 100 to the optional fuel cooler 20. First fluid passage, labeled in FIG. 2A as Retentate outlet Ro, 150 provides a connection between the separation unit and a fuel line. While first fluid passage 150 is shown as a nut, which indicates a compression-type fitting, this connection can be any type of releasable connection including a screw fitting, a pressure fitting, snap fitting, or any other known connection system. Second fluid passage 160, labeled in FIG. 2A as inlet (I), provides fuel to the permeable substrate. Second fluid passage 160 is a structure which engages with connector plate 200.

Figure 2B:
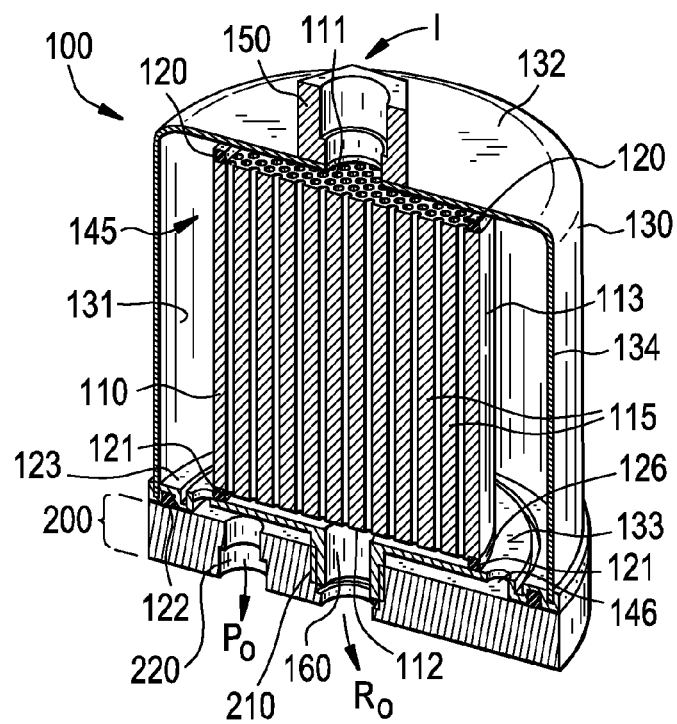

In embodiments, as shown in FIG. 2B, the direction of flow through a separation unit may be reversed. For example, In FIG. 2A, fluid is illustrated as flowing into the unit at the unit's bottom end (I) through second fluid passage 160 and out of the housing through first fluid passage 150. In FIG. 2B, fluid is illustrated flowing into the unit at the unit's top end (I) through first fluid passage 150 and out of the unit at the unit's bottom end through second fluid passage 160. In both embodiments, fluid flows into the unit, retentate flows through the channels of the permeable substrate and out through the Ro fluid passage, and permeate flows into the channels of the permeable substrates, passes into the permeable substrate, into the permeate chamber, and out through the Po fluid passage. The same separation unit may accommodate both directions of flow, and accomplish the task of separating fluid. The direction of flow can be determined by the placement of the unit in a fuel line.

The fuel separation unit 100 has a housing 130. In embodiments, housing 130 is a "first housing." In embodiments (such as the embodiments shown in FIG. 3 and 4), the fuel separation unit 100 may comprise more than one housing. As shown in FIGS. 2A and 2B housing 130 is structured and arranged to contain the permeable substrate 110. Housing 130 has an internal surface 131, a first end plate 132, a second end plate 133 and a sidewall 134. As illustrated in FIGS. 2-6, the housing is cylindrical, so that there is a first end plate 132, a second end plate 133 and one sidewall forming the cylindrical body of the housing. However, in embodiments, the housing, and the permeable substrate contained within the housing, may be any shape. For example, the housing and the permeable substrate may be cube-shaped, cuboid, conical, prismatic, or any other shape.

In embodiments, a seal 120 is present between the permeable substrate and the housing. In embodiments, the seal is a gasket, an o-ring, a fitting, a bead of seal material, or any other structure or material known in the art that may be useful to form a seal between the permeable substrate and the housing. Seal 120 prevents retentate from mixing with permeate. Seal 120 provides a barrier between the retentate flow path and the permeate flow path.

In embodiments, housing 130 may have a manifold 140. In embodiments, the manifold is a structure, extending into the internal space formed by the housing, to create a contained (and, together with the seal, a sealed) space between an end face of the permeable substrate and an inlet or an outlet. For example, as illustrated in FIG. 2A, a manifold 140 forms a contained space defined by the first end face 111 of the permeable substrate 110 and the first fluid passage 150 and separated from a permeate chamber 145. The manifold may be present (as shown in FIG. 2A) or absent (as shown in FIG. 2B). FIG. 2A illustrates an embodiment of the manifold 140. In FIG. 2A, the manifold is a structure that extends from an internal surface of the first end plate (not shown) of the housing 130. In the embodiment illustrated in FIG. 2A, the manifold 140 provides a structure to seat a seal 120, formed between the permeable substrate 110 and the manifold 140 and the first fluid passage 150, and the permeate chamber 145. A manifold may be present at either end face of the permeable substrate, at both end faces of the permeable substrate, at one end face of the permeable substrate, or absent.

FIG. 2B illustrates an embodiment of the housing without a manifold. In this embodiment, seal 120 is provided between the permeable substrate and the internal surface (not shown) of the first end plate 132 of the housing 130.

A seal 122 is also formed between the second end face 112 of the permeable substrate 110 and the second end plate 133 of the housing 130. In embodiments, a manifold may be present between the second end plate 133 and the permeable substrate (not shown).

The second end plate has a second fluid passage 160. Second fluid passage 160 allows fluid (fuel) to flow into the channels of the permeable substrate 110 (or out of the channels, depending upon the direction of fuel flow). In embodiments, the external surface of second fluid passage 160 has male threading to allow the inlet to releasably engage with and seal against a connector plate 200. As shown in FIGS. 2A and 2B, second end plate 133 may have seats or grooves 123 for containing seals or gaskets. In additional embodiments, connector plate 200 may have grooves or other structures for containing seals or gaskets (not shown). That is, the seals 122 may be part of the housing, part of the connector plate, or a separate part.

When the permeable substrate is placed inside the housing and the seals are placed at or near the first and second end faces of the permeable substrate, a permeate chamber 145 is formed between the outer surface 113 of the permeable substrate 110 and the internal surface 131 of the housing 130. The permeate chamber has a permeate chamber outlet 146. The permeate chamber outlet 146 may be in the second end plate 133 of the housing 130 as shown in FIG. 2A and FIG. 2B. There may be multiple permeate chamber outlets 146 (as shown in the exploded view of FIG. 4). Permeate chamber outlets are structured and arranged to allow permeate to flow from the permeate chamber and out of the fuel separation device through the connector plate permeate outlet(s) marked Po. In embodiments, a seal 122 may be present between the housing 130 and the connector plate 200 to ensure a liquid-tight seal, and a seal to hold a vacuum between the housing 130 and the connector plate 200.

In embodiments, a pressure gradient may be formed between the permeate chamber 145 and, for example, second fluid passage 160. In embodiments, a vacuum is applied in the permeate chamber 145. In embodiments, vacuum may be applied through the connector plate permeate chamber outlet(s) (Po). This pressure gradient acts to pull permeate through the permeable substrate and deliver it to the permeate outlet.

Also illustrated in FIGS. 2A and B is a connector plate 200. The connector plate 200 is structured and arranged to releasably engage with housing 130 of separation unit 100. The connector plate 200 has a baseplate inlet 210. In embodiments, the baseplate inlet is internally threaded to allow the threaded housing inlet to screw into the baseplate at the inlet. Although threading is described, those of ordinary skill will understand that other methods of releasable attachment and sealing are well known in the art. These include snap fittings, pressure fittings, and other releasable attachment mechanisms. The connector plate also has a permeate outlet 220 to allow fluid that is captured in the permeate chamber of the separation unit 100 to exit the separation unit through the permeate chamber outlet, and through the connector plate permeate outlet 220. In embodiments, the connector plate is a part of the separation unit. In additional embodiments, the connector plate is separate from the separation unit, and is a structure that is part of the automobile's fuel system. For example, in the gasoline separation system illustrated in FIG. 1, the connector plate could be a part of the automobile's fuel system. If a separation unit is to be installed into an automobile, the housing containing the permeable substrate could be installed or releasably sealed against the connector plate. If the separation unit is to be replaced, the old separation unit can be removed (unscrewed) from the connector plate and a new separation unit installed. If a separation unit is not intended to be used, a fuel line could be installed between the baseplate inlet 210 and outlet 150. In addition, the connector plate is structured and arranged to engage with the permeate outlet of the housing to provide a fluid flow passage between the permeate outlet. Fuel lines or other structures can provide a fluid flow passageway between the permeate outlet (Po) and the auxiliary fuel tank (see 11, FIG. 1).

Figure 3:
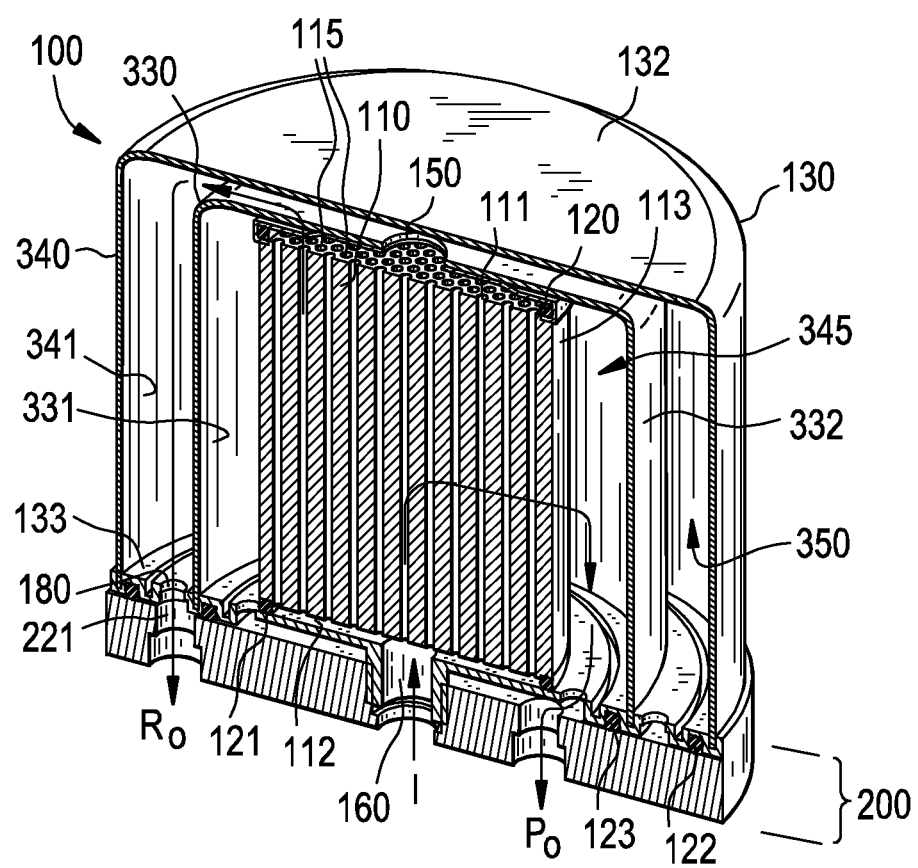
FIG. 3 is an illustration of an additional embodiment of a replaceable fuel separation unit.

FIG. 3 illustrates an additional embodiment of the separation unit of the present invention. FIG. 3 illustrates a separation unit having a first housing 330 and a second housing 340. The first housing contains permeable substrate 110 having an outer surface 113. A permeate chamber 345 is formed between the internal surface 331 of the first housing 330 and the outer surface 113 of the permeable substrate 110. Seals 120 and 121 are present between the permeable substrate and the first housing at or near the first end face and the second end face of the permeable substrate. First housing 330 has a first fluid passage 150. First fluid passage 150 of first housing 330 opens into a retentate chamber 350 formed between the outer surface 332 of first housing 330 and the inner surface 341 of second housing 340.

In this embodiment, fluid flows into the separation unit, as shown by the upwardly pointing arrow ("I") in FIG. 3, flows through the separation unit, and exits the separation unit as retentate (through first fluid passage 150 and retentate outlet or Ro) and permeate (through Permeate outlet or Po) according to the downwardly pointing arrows of FIG. 3.

FIG. 3 illustrates fluid flow pathways in embodiments of the separation unit 100. Because the permeable substrate is sealed by seals 120 and 121 at or near its first end face and at or near its second end face, fluid can only flow through the separation unit in two flow paths. Fluid can flow through the inlet (I) in the second end plate 133 into the permeable substrate 110, through the channels 115 of the permeable substrate 110, through the first end face 111 of the permeable substrate 110, through the optional manifold 140, and out of the housing (or the first housing 330) of the separation unit through the first fluid passage 150. In the embodiment illustrated in FIG. 3, retentate flows from the first fluid passage 150 of first housing 330 into a retentate chamber 350 formed between the outer surface 332 of first housing 330 and the inner surface 341 of second housing 340. Retentate then exits the separation unit through the retentate chamber outlet 180 and the connector plate retentate outlet 221.

Or, fluid can flow into the separation unit 100 through second fluid passage 150 ("I" in FIG. 3), into the permeable substrate 110 at the second end face 112 of the permeable substrate 110, across the separation membrane, through the permeable substrate body 110, into the permeate chamber 345 (145 in FIGS. 2A and 2B), and out of the separation unit through the permeate outlet Po (145 in FIGS. 2A and 2B).

Figure 4:
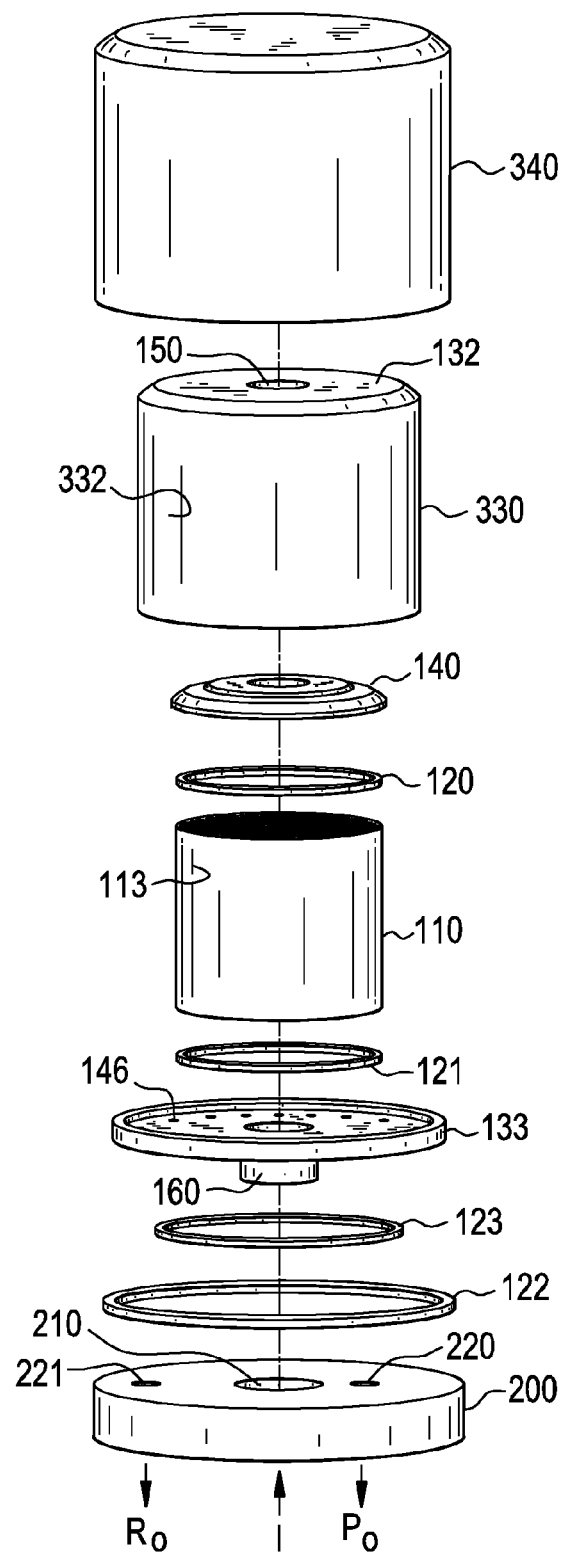
FIG. 4 is an exploded view of the embodiment of a replaceable fuel separation unit shown in FIG. 3.

FIG. 4 is an exploded view of the embodiment of the separation unit as shown in FIG. 3. FIG. 4 illustrates the second housing 340, the first housing 330 having the first end plate 132, the manifold 140 which sits inside the second housing, the first seal 120 which forms a seal between the permeable substrate 110 and the manifold 140 (or, in the absence of a manifold, the first seal 120 forms a seal between the permeable substrate and the interior surface of the first end plate 132) the permeable substrate 110, the second seal 121 which forms a seal between the permeable substrate 110 and the second end plate 133 (or, in the presence of a second manifold, the second seal 121 forms a seal between the permeable substrate and the second manifold), the second end plate 133 having permeate or permeate chamber outlets 146 and an second fluid passage 150 which can be threaded to engage with the connector plate inlet 210, a third seal 123 and a fourth seal 122 which form seals between the second end plate 133 and the connector plate 200 to form a defined space to separate the permeate chamber 345 from the retentate chamber 350 and to separate the permeate outlet 220 from the retentate outlet 221.

The flow of fluid is illustrated by the arrows. For example, permeate flows into the separation unit (I), into the permeable substrate 110, out through the outer surface 113 of the permeable substrate 110, into the permeate chamber (see 345 of FIG. 3 or 145 of FIGS. 2A and 2B), and then through the permeate chamber outlets 146, into the space formed between third seal 123 and fourth seal 122, and then out of the connector plate (Po) through connector plate permeate outlet 220 (see Po, FIG. 3). Retentate flows into the separation unit (I), through the channels of the permeable substrate 110, through the first fluid passage 150 of the first housing 330, into retentate chamber 350 (not shown), which is the space formed between the outer surface 332 of first housing 330 and the inner surface 341 (not shown) of second housing 340. Retentate then exits the separation unit through the connector plate retentate outlet 221. In this way, a single stream of fluid is separated into a retentate (which may be, for example, LoRON) and a permeate (which may be, for example, HiRON).

Figure 5A:
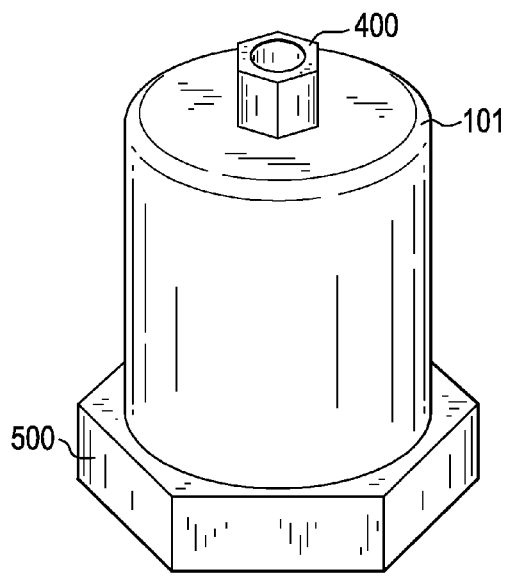
FIGS. 5A and 5B are a plan view and a cross-sectional view of the placement of a replaceable fuel separation unit seated on a connector plate, in an embodiment.
Figure 5B:
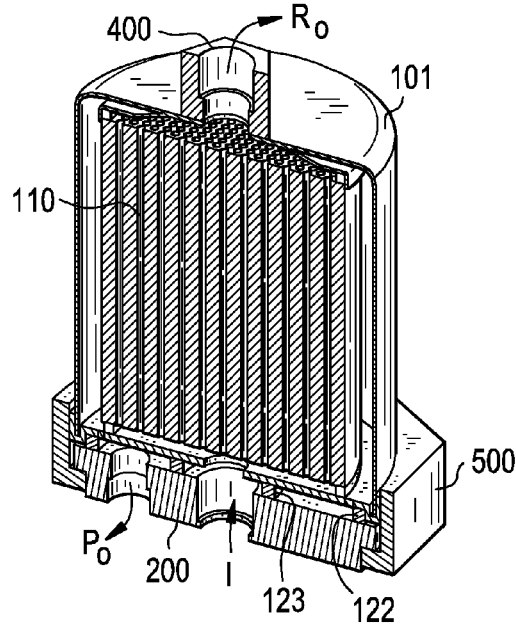

FIGS. 5A and 5B are a plan view and a cross-sectional view of the placement of a housing of the present invention seated on a connector plate 200, in a seat 500, in an embodiment. As shown in FIGS. 5A and 5B, the housing 101 containing the permeable membrane 110 can be fitted onto the connector plate 200, contained in a seat 500, against seals 122 and 123, by forming a compression seal using, for example, a bolt 400. In embodiments (see FIGS. 2A and B) the housing may be threaded onto the connector plate 200 prior to seating the connector plate into the seat 500. In additional embodiments, the housing may be separated from the connector plate, forming flow pathways for permeate and retentate, by the use of seals such as sealing rings, O-rings, gaskets or the like. In embodiments, the fuel separation unit housing is secured to the seat by a compression fitting.

Figure 6A:
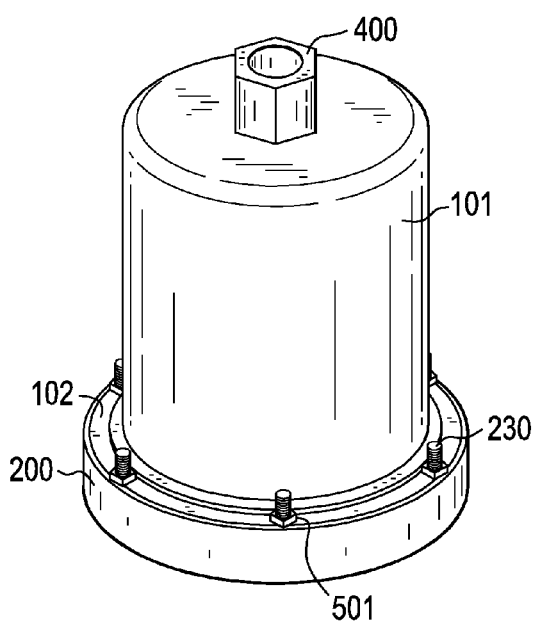
FIGS. 6A and 6B are a plan view and a cross-sectional view of the placement of a replaceable fuel separation unit seated on a connector plate, in another embodiment.
Figure 6B:
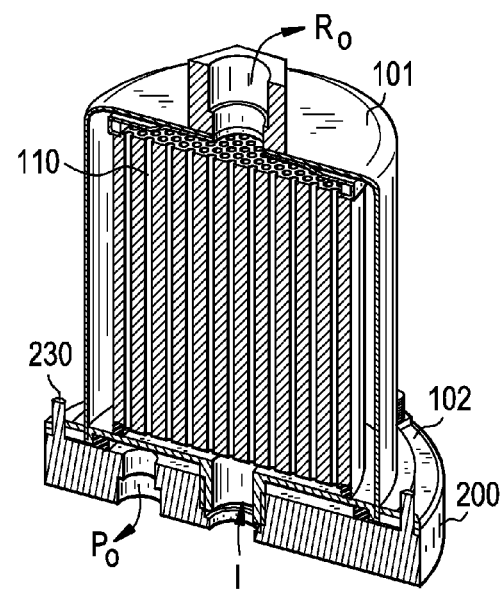

FIGS. 6A and 6B are a plan view and a cross-sectional view of the placement of a housing of the present invention engaged on a connector plate, in another embodiment. As shown in FIGS. 6A and 6B, housing 101 may have a flange 102 that extends outwardly from the connector plate-end of the housing 101. The connector plate has screws 230. The flange 500 has apertures to allow screws 230 to be threaded through the flange 500, which can be tightened with nuts 501. In this embodiment, a compression fitting can be provided between the housing and the connector plate.

While the invention has been described in the accompanying figures, it will be apparent to those skilled in the art that various modifications and variations can be made without departing from the spirit or scope of the invention.

What is claimed is:

1. A replaceable fuel separation unit comprising:
  a permeable substrate having a first end face, a second end face, a plurality of parallel channels extending from the first end face to the second end face, and an outer surface;
  a first housing structured and arranged to contain the permeable substrate, having an intermediate internal surface, the first housing comprising a first end plate and a second end plate defining respective first and second outer ends of the housing, wherein the intermediate internal surface of the first housing is disposed between the first end plate and the second end plate, the first end plate comprising a first fluid passage and
    a first end plate seal structured and arranged to form a seal between the first end plate and the permeable substrate at or near a periphery of the first end face of the permeable substrate, wherein the first end plate seal is disposed spaced from and outside of a periphery defining the first fluid passage,
  the second end plate comprising a second fluid passage, a permeate chamber outlet, and a second end plate seal structured and arranged to form a seal between the second end plate and the permeable substrate at or near a periphery of the second end face of the permeable substrate, wherein the second end plate seal is disposed spaced from and outside of a periphery defining the second fluid passage; and
  a permeate chamber comprising a space formed between the outer surface of the permeable substrate and the intermediate internal surface of the first housing;
  wherein the permeate chamber is separated from the end faces of the permeable substrate by the first end plate seal and the second end plate seal, and outer side portions of the first and second end plate seals do not abut against respective first and second end plates, and are spaced by a gap within the permeate chamber from the intermediate internal surface of the first housing.

2. The separation unit of claim 1 wherein the first fluid passage is an inlet and the second fluid passage is a retentate outlet, wherein the inlet receives a mixed gasoline feed stream comprising a high Research Octane Number fuel portion as a permeate and a low Research Octane Number fuel portion as a retentate, and wherein the retentate outlet outputs retentate that is separated from the permeate within the permeable substrate.

3. The separation unit of claim 1 wherein the first fluid passage is a retentate outlet and the second fluid passage is an inlet, wherein the inlet receives a mixed gasoline feed stream comprising a high Research Octane Number fuel portion as a permeate and a low Research Octane Number fuel portion as a retentate, and wherein the retentate outlet outputs retentate that is separated from the permeate within the permeable substrate.

4. The fuel separation unit of claim 1, further comprising a connector plate and a connector plate seal structured and arranged to form a releasable seal between the connector plate and the second end plate wherein:
  the second end plate seal has a first diameter, and the connector seal has a second diameter that is greater than the first diameter;
  the permeate chamber outlet of the second end plate is disposed between the second end plate seal and the intermediate inner surface of the housing;
  the connector seal is disposed in a groove of the second end plate configured to receive the connector seal, wherein the groove is disposed between the permeate chamber outlet of the second end plate and the intermediate inner surface of the housing;
  the connector plate comprises an inlet and a permeate outlet; and
  the connector plate comprises fittings to releasably attach the housing containing the permeable membrane to the inlet and the permeate outlet of the connector plate.

5. The fuel separation unit of claim 2, further comprising a connector plate and a connector plate seal structured and arranged to form a releasable seal between the connector plate and the second end plate wherein:
  the second end plate seal has a first diameter, and the connector seal has a second diameter that is greater than the first diameter;
  the connector plate comprises a retentate outlet and a permeate outlet; and
  the connector plate comprises fittings to releasably attach the housing containing the permeable membrane to the retentate outlet and the permeate outlet of the connector plate.

6. The fuel separation unit of claim 3, further comprising a connector plate and a connector plate seal structured and arranged to form a releasable seal between the connector plate and the second end plate wherein:
the second end plate seal has a first diameter, and the connector seal has a second diameter that is greater than the first diameter;
the connector plate comprises an inlet and a permeate outlet; and
the connector plate comprises fittings to releasably attach the housing containing the permeable membrane to the inlet and the permeate outlet of the connector plate.

7. The fuel separation unit of claim 4 wherein the housing is secured to the connector plate by a compression fitting.

8. The fuel separation unit of claim 4 wherein the housing is secured to the connector plate by a screw-fitting.

9. The fuel separation unit of claim 1 further comprising a connector plate and a connector plate seal structured and arranged to form a releasable seal between the connector plate and the second end plate, wherein:
the second end plate seal has a first diameter,
the connector seal has a second diameter that is greater than the first diameter,
the permeate chamber outlet of the second end plate is disposed between the second end plate seal and the intermediate inner surface of the housing,
the second end plate comprises a groove that is configured to receive the connector seal and that is disposed between the permeate chamber outlet of the second end plate and the intermediate inner surface of the housing, and
the connector seal is disposed in the groove of the second end plate.

10. The fuel separation unit of claim 9 wherein the connector plate comprises an inlet, a permeate outlet and a retentate outlet.

11. The fuel separation unit of claim 9 wherein the connector plate comprises at least one groove for containing the connector seal.

12. The fuel separation unit of claim 1, wherein at least one of the first end plate and the second end plate of the first housing comprises a manifold and wherein the seal, formed between at least one of the first end plate and the second end plate and the permeable substrate, is formed between the manifold and the permeable substrate.

13. The fuel separation unit of claim 2, wherein at least one of the first end plate and the second end plate of the first housing comprises a manifold and wherein the seal, formed between at least one of the first end plate and the second end plate and the permeable substrate, is formed between the manifold and the permeable substrate.

14. The fuel separation unit of claim 3, wherein at least one of the first end plate and the second end plate of the first housing comprises a manifold and wherein the seal, formed between at least one of the first end plate and the second end plate and the permeable substrate, is formed between the manifold and the permeable substrate.

15. The fuel separation unit of claim 1, further comprising a second housing structured and arranged to provide a retentate chamber between an outer surface of the first housing and an inner surface of second housing.

16. The fuel separation unit of claim 2, further comprising a second housing structured and arranged to provide a retentate chamber between an outer surface of first housing and an inner surface of second housing.

17. The separation unit of claim 1 wherein the permeable substrate comprises a porous ceramic material.

18. The separation unit of claim 1 wherein the permeable substrate is cylindrical.

19. The separation unit of claim 10 wherein the second fluid passage of the second end plate comprises one of male and female threading and is releasably engageable to the inlet of the connector plate that comprises the other of male and female threading, and wherein the second end plate seal is disposed on a first top surface of the second end plate and the connector plate seal is disposed against a second bottom surface of the second end plate disposed opposite the first top surface.

20. The separation unit of claim 1 wherein the second end plate comprises a plurality of permeate chamber outlets.

* * * * *